United States Patent [19]
Erickson

[11] Patent Number: 5,340,200
[45] Date of Patent: * Aug. 23, 1994

[54] BRUSH RECYCLING APPARATUS

[76] Inventor: Kenneth R. Erickson, 12827 Camino Ramillette, San Diego, Calif. 92128

[*] Notice: The portion of the term of this patent subsequent to Oct. 19, 2010 has been disclaimed.

[21] Appl. No.: 8,144

[22] Filed: Jan. 25, 1993

Related U.S. Application Data

[63] Continuation-in-part of Ser. No. 819,996, Jan. 13, 1992, Pat. No. 5,253,927.

[51] Int. Cl.⁵ ................... A46D 1/045; A46D 1/08
[52] U.S. Cl. ................................. 300/2; 425/11
[58] Field of Search ............. 300/2, 21; 264/243; 422/26; 206/362.1; 425/11

[56] References Cited

U.S. PATENT DOCUMENTS

| | | | |
|---|---|---|---|
| 2,531,066 | 11/1950 | Lynch | 206/362.1 |
| 2,720,439 | 10/1955 | Cristoval | 206/362.1 |
| 2,794,696 | 6/1957 | Alves | 206/362.1 |
| 4,214,657 | 7/1980 | Winston | 206/209.1 |
| 5,127,521 | 7/1992 | Bourque | 206/362.1 |
| 5,253,927 | 10/1993 | Erickson | 300/2 |

Primary Examiner—Mark Rosenbaum
Assistant Examiner—John M. Husar
Attorney, Agent, or Firm—Brown, Martin, Haller & McClain

[57] ABSTRACT

Brushes such as toothbrushes are recycled in an apparatus having an inner, steam chamber and a brush restraining holder mounted over an outlet from the steam chamber. The brush holder has a mold cavity communicating with the steam chamber outlet and having an opening for allowing at least partial insertion of the bristle part of a toothbrush to be recycled into the cavity. The cavity has a cross-sectional periphery of shape and dimensions substantially matching the cross-sectional periphery of the bristle part of a brush to be recycled.

12 Claims, 2 Drawing Sheets

BRUSH RECYCLING APPARATUS

CROSS-REFERENCES TO RELATED APPLICATIONS

This application is a continuation-in-part of copending application Ser. No. 07/819,996, filed Jan. 13, 1992 now U.S. Pat. No. 5,253,996.

BACKGROUND OF THE INVENTION

The present invention relates generally to an apparatus for recycling brushes having a handle, a head, and bristles of moldable material such as plastic projecting from the head, and is particularly concerned with an apparatus for recycling toothbrushes.

Toothbrushes generally wear out with repeated use and must be replaced at relatively frequent intervals. Initially, the bristles extend parallel to one another and substantially perpendicular to the brush head along straight bristle axes. The bristles are formed from a polymeric material with the polymer molecules aligned parallel to the bristle axis, creating a spring-like material which tends to spring back to the original straight line shape after deformation or flexing. However, this springiness tends to be lost after extended use, so that the bristles become permanently bent and splay out from the head. This reduces the effectiveness of the brush in removing matter from the teeth, and it is therefore generally recommended that individuals replace toothbrushes at intervals of no more than three months. Thus, each individual discards four or more toothbrushes per year, resulting in waste and loss of valuable resources.

Equipment has been used in the past for sterilizing personal hygiene items such as toothbrushes, but this has typically involved directing ultraviolet light onto the head of the brush, and will not extend the lifetime of the brush or reduce the effects of wear.

SUMMARY OF THE INVENTION

It is an object of the present invention to provide a new and improved apparatus for recycling toothbrushes and other brushes having moldable bristles.

According to the present invention, a toothbrush recycling apparatus is provided which comprises a housing having an inner chamber for holding water, a heater for heating water in the inner chamber to form steam, the chamber having an outlet orifice for allowing steam to escape from the chamber, and a restraining holder fitting over the outlet orifice for receiving the bristle part of a brush head. The restraining holder has a mold chamber which communicates with the outlet orifice, and has a cross-sectional periphery of shape and dimensions corresponding to those of the bristle part of the brush head, and a releasable retaining clip is preferably provided for releasably holding the brush head on the restraining holder so that the bristles extend at least partially into the mold chamber.

Preferably, the restraining holder has upstanding side walls defining a mold chamber. The shape of the mold chamber will correspond to the shape of the original brush, for example rectangular. Inserts may be provided to alter the shape and size of the mold chamber to accommodate other brush shapes and sizes. One of the side walls may be adjustable outwardly to allow insertion of the brush bristles into the chamber and inwardly to bear against the bristles and return them to their original configuration as they are heated and softened by steam entering the chamber. Once the bristles have been sufficiently heated, the heater is turned off and the brush is left with the bristles in the mold chamber for a sufficient time interval for the bristles to cool. The restraining holder may be removably mounted over the outlet orifice, so that it can be lifted off after heating and allowed to cool more rapidly.

This apparatus allows brush head bristles to be reshaped into substantially their original straight condition, while the steam will also act to sterilize the brush head. Thus, toothbrush lifetime can be significantly extended, as can the useful life of other brushes of a similar nature.

BRIEF DESCRIPTION OF THE DRAWINGS

The present invention will be better understood from the following detailed description of a preferred embodiment of the present invention, taken in conjunction with the accompanying drawings, in which like reference numerals refer to like parts, and in which.

DESCRIPTION OF THE PREFERRED EMBODIMENT

Figure 1:
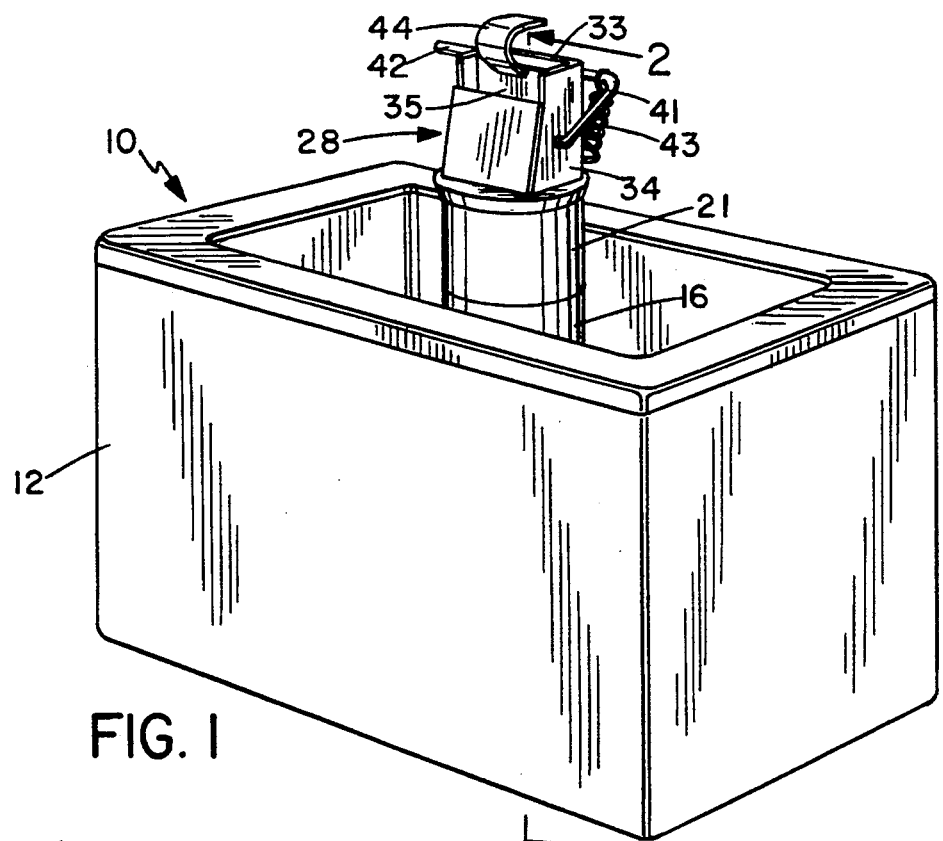
FIG. 1 is a perspective view of a toothbrush recycling apparatus according to a preferred embodiment of the invention.
Figure 2:
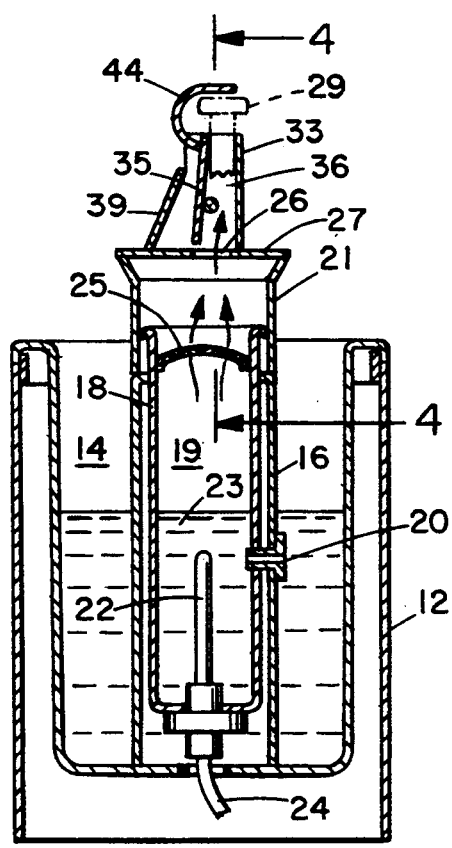
FIG. 2 is a sectional view taken on line 2—2 of FIG. 1.

The drawings illustrate a toothbrush recycling apparatus 10 according to a preferred embodiment of the present invention. The apparatus basically comprises a housing or water bath unit 12 having a main chamber or water bath 14 and a vertical tube or chimney 16 mounted vertically in the chamber 14. In the illustrated embodiment, the main chamber is open at the top, although it may be closed in alternative embodiments. As best illustrated in FIG. 2, an inner tube 18 is supported within chimney 16 to form a separate inner chamber 19, with a small orifice 20 connecting the interior of chamber 18 to the water bath 14 for providing a restricted flow of water between the two chambers. A removable tubular end cap unit 21 is fitted over the open upper end of inner tube 18.

Figure 4:
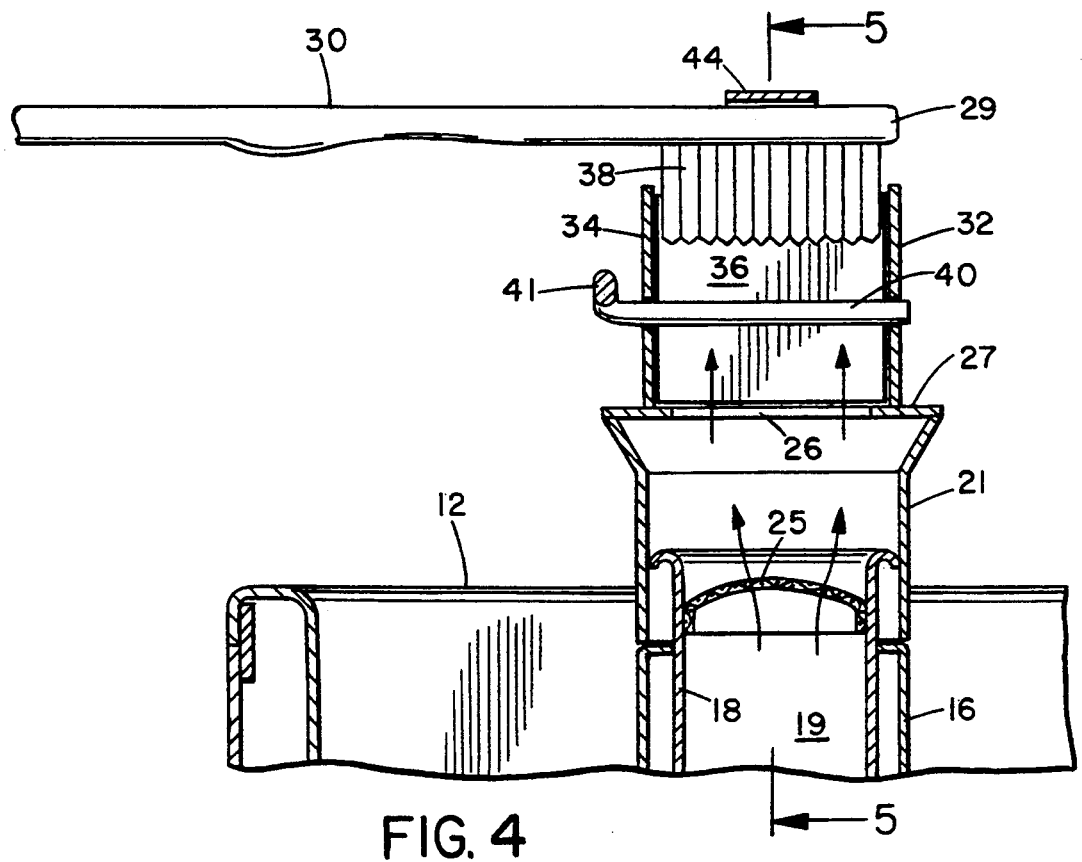
FIG. 4 is an enlarged sectional view taken on line 4—4 of FIG. 2.
Figure 5:
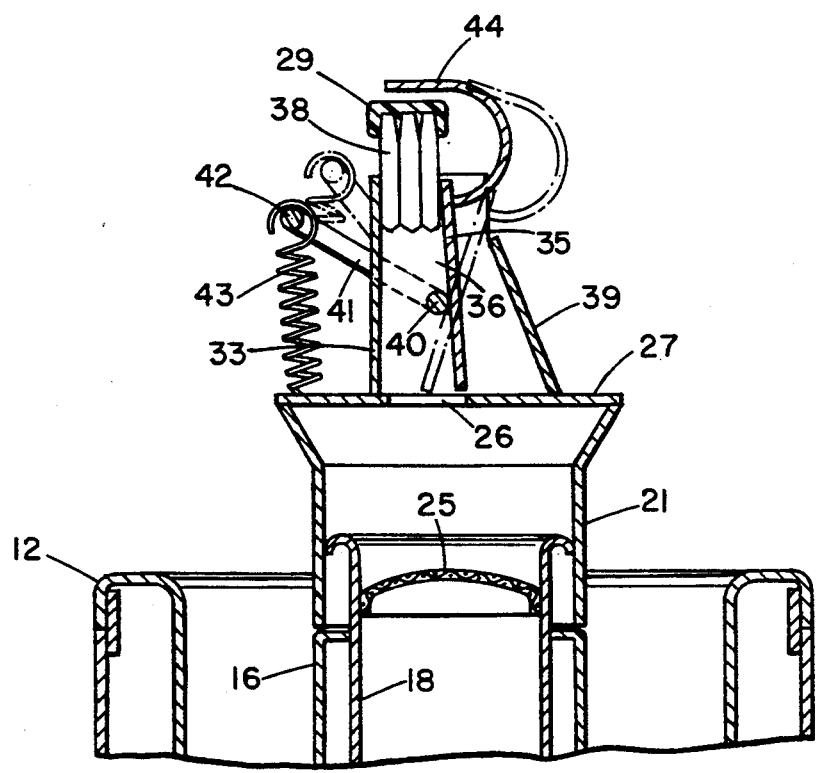
FIG. 5 is a sectional view taken on line 5—5 of FIG. 4.

A heater element 22 is mounted in the bottom of inner chamber 18 to heat the water 23 in the chamber to produce steam. The heater is connected by wiring 24 to a suitable power supply (not illustrated). A filter 25 is mounted across the open upper end of inner chamber 18 to retain any particles in the steam output. End cap unit 21 has a steam orifice or outlet 26 in its closed end wall 27 and a retaining holder 28 is mounted over the outlet 26 to hold the head 29 of a toothbrush 30 across the outlet, as best illustrated in FIGS. 2, 4 and 5. The housing, chimney and inner tube of the housing unit are suitably formed of metal or heat resistant plastic material, and the various parts are secured together by welding or the like. The end cap unit is formed of similar material.

The toothbrush holder 26 has three upstanding fixed side walls 32, 33 and 34, extending upwardly from the closed upper end 25 of the chimney, and an adjustable side wall 35, which together define a mold cavity 36 for receiving the bristles 38 of a brush head 28. The cross-sectional periphery of the mold chamber is of shape and dimensions which substantially match the cross-sectional periphery of the bristle part 38 of the brush head, as illustrated in FIGS. 4 and 5. In the illustrated embodiment, the mold chamber is rectangular to match the shape of most hand-held brushes. However, mold chambers of alternative shapes and sizes may be provided as inserts to accommodate other brush styles.

Figure 3:
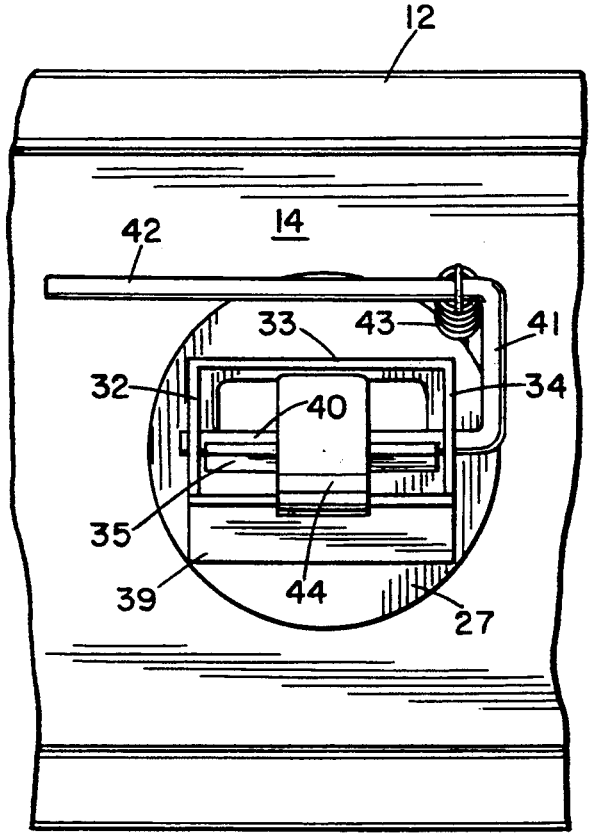
FIG. 3 is an enlarged top plan view of the toothbrush holder.

The steam orifice 24 is a rectangular orifice which extends across substantially the entire base of the mold cavity 36, as best illustrated in FIG. 3, to ensure even distribution of steam over all the bristles 38.

A tilted, fixed side wall portion 39 of reduced height extends between end side walls 32 and 34, and the adjustable side wall 35 is mounted inside the tilted side wall portion 39. The adjustable side wall is supported on pivot pin or shaft 40 which extends through aligned openings in the end walls 32 and 34, as best illustrated in FIGS. 4 and 5. The pivot pin 40 has an extended handle at one end which extends outside the holder 26. The handle has a first portion 41 extending perpendicular to pivot pin 40 along end wall 34, and a second portion 42 extending perpendicular to portion 41 along side wall 33. A biassing spring 43 is secured between end portion 42 and the upper end 25 of the chimney, as best illustrated in FIG. 5. A C-shaped retaining clip or hook 44 is supported at the upper end of adjustable side wall 35.

This arrangement allows the adjustable side wall 35 to be tilted or pivoted between the open or released position illustrated in dotted outline in FIG. 5, and the closed or upright position illustrated in solid outline in Figure 5. The side wall 35 is tilted away from the mold cavity into the released position by pulling up the end portion 42 of the handle, thereby rotating the pin in a clockwise direction as illustrated in FIG. 5 and tilting the wall 35 backwards. This leaves the upper end of the mold chamber open so that at least part of the bristle portion 38 of a brush head can be inserted into the chamber, into the position illustrated in FIG. 5, with the bristles 38 extending partially into the mold cavity. At this point the end portion 42 is released, and the portion 42 is pulled down under the action of return spring 43, simultaneously rotating pivot pin 40 back in an anti-clockwise direction and pulling the wall 35 back into its upright position. The C-clip 44 will in turn engage over the top of the brush head to retain it in position, as illustrated in FIG. 5. This will prevent any movement of the brush during a recycling operation. The adjustable side wall 35 will apply some pressure against the sides of the bristles 38 under the action of spring 43.

Operation of the apparatus will now be described in more detail. Water is first poured into the main chamber or water bath, and will enter the inner chamber via orifice 20. The end portion 42 is then pulled up to open the mold chamber and a toothbrush is positioned with the bristle portion of the head in the mold chamber. End portion 42 is then released, swinging the C-clip back up over the top of the brush head and tilting the side wall 35 against one side of the bristles, as illustrated in FIG. 5. This will tend to force any bent or splayed bristles back into a straight condition.

The power supply is then turned on to operate the heater, heating the water 22 in chamber 18 to create steam. Because the chamber 18 is double walled with an air gap between the inner cylindrical chamber and the outer tube or chimney, and surrounded by water in the outer or main chamber, it will be effectively insulated and heating will be substantially confined to the bristle portion of the brush held in the mold chamber. This avoids undesirable heating and potential softening of the brush head and handle. Steam will be directed into the mold chamber and over the bristles, heating the bristles and softening them into a moldable condition. After a sufficient time interval, typically of around 5–10 minutes, the power supply is turned off and the end cap is lifted off the housing unit together with the toothbrush, and placed in a suitable location for cooling purposes. The brush is left with the bristle portion of the brush head in the mold chamber for a sufficient time period for the bristles to harden. Typically, a time interval of ten to fifteen minutes will be sufficient for the bristles to be re-molded into a configuration substantially matching that of the mold chamber, with the bristles being substantially straightened to extend perpendicular to the brush head and parallel to one another, as in a new toothbrush. Thus, toothbrushes and other brushes can be re-shaped easily to substantially their original form, increasing their effective lifetime and reducing waste.

The bristles of a new toothbrush and of many other types of brush are made of a polymeric material designed to resist matting or permanent deformation. The basic manufacturing operation involves a cold drawing process which lines up polymer molecules parallel to the bristle axis. This produces a spring-like recovery in the bristles, so that they will initially tend to spring back to their original straight form after any deformation. However, over repeated use this spring-like recovery is lost, so that the bristles become permanently deformed. At this point, the recycling apparatus of this invention can be used to restore the original molecular structure of the bristle to a great extent. The application of moist heat and moderate pressure to deformed bristles in a suitably dimensioned mold chamber will soften them and render them moldable, and will tend to re-align at least some of the polymer molecules with the bristle axis so that the springy character of the bristles is at least partially restored. Thus, toothbrushes and other types of brushes can be readily recycled to extend their useful life, reducing waste of valuable materials. The apparatus will have the additional advantage of sterilizing the bristles.

Although a preferred embodiment of the invention has been described above by way of example only, it will be understood by those skilled in the field that modifications may be made to the disclosed embodiment without departing from the scope of the invention, which is defined by the appended claims.

I claim:

1. A recycling apparatus for brushes having moldable bristles, comprising:
   a housing having an inner chamber for receiving water;
   heater means for heating water in the chamber to produce steam;
   the chamber having at least one outlet for allowing steam to escape from the chamber; and
   a restraining holder mounted over said outlet, the holder having a mold cavity communicating with said outlet, the cavity having an opening for at least partial insertion of the bristle part of a brush head into the cavity, the mold cavity having a cross-sectional periphery of shape and dimensions substantially matching the cross-sectional periphery of the bristle part of a brush head.

2. The apparatus as claimed in claim 1, wherein the restraining holder is removably mounted over said outlet orifice.

3. The apparatus as claimed in claim 1, wherein the restraining holder has three fixed side walls and one adjustable side wall defining a mold cavity.

4. The apparatus as claimed in claim 3, including biassing means for urging the adjustable side wall against the bristle part of a brush in said cavity.

5. The apparatus as claimed in claim 3, wherein the adjustable side wall is moveable between a retracted position tilted away from the opposite side wall of the cavity to increase the size of the opening, and an operative position tilted towards the opposite side wall to bear against the bristle part of a brush inserted in said cavity.

6. The apparatus as claimed in claim 5, including clip means at the upper end of said adjustable side wall for extending over the top of a brush head in said operative position when the bristle part of the brush head is located in said cavity.

7. The apparatus as claimed in claim 1, including clip means for releasably securing the brush head to the restraining holder.

8. The apparatus as claimed in claim 7, wherein the clip means comprises a C-clip member adjustably mounted on said holder for movement between a retracted position spaced from the opening of the cavity and an operative position extending at least partially across the opening of the cavity to bear against the top of a brush head when the bristle part of the brush head is positioned in the cavity.

9. The apparatus as claimed in claim 1, wherein the housing has an outer chamber surrounding said inner chamber, and a vertical tubular member mounted in said outer chamber and extending upwardly through said outer chamber, the tubular member forming said inner chamber and having an orifice connecting said inner chamber to said outer chamber.

10. The apparatus as claimed in claim 9, wherein the tubular member is double walled.

11. The apparatus as claimed in claim 9, wherein said restraining holder includes a removable end cap portion for fitting over the outlet of said inner chamber.

12. The apparatus as claimed in claim 11, wherein the end cap portion has an end wall, the restraining holder has side walls projecting upwardly from said end wall to define said mold cavity, and the end wall has an orifice communicating with said mold cavity.

* * * * *